(12) United States Patent
Bringuier

(10) Patent No.: US 6,249,629 B1
(45) Date of Patent: Jun. 19, 2001

(54) ROBUST FIBER OPTIC CABLES

(75) Inventor: Anne G. Bringuier, Taylorsville, NC (US)

(73) Assignee: Siecor Operations, LLC, Hickory, NC (US)

( * ) Notice: Subject to any disclaimer, the term of this patent is extended or adjusted under 35 U.S.C. 154(b) by 0 days.

(21) Appl. No.: 09/209,076

(22) Filed: Dec. 10, 1998

(51) Int. Cl.$^7$ .................................................. G02B 6/44
(52) U.S. Cl. .......................... 385/113; 385/111; 385/112; 385/109; 385/103; 385/101
(58) Field of Search .................................. 385/113, 112, 385/111, 109, 101, 103

(56) References Cited

U.S. PATENT DOCUMENTS

| | | | |
|---|---|---|---|
| 4,072,398 | * 2/1978 | Larsen et al. | 350/96.23 |
| 4,143,942 | 3/1979 | Anderson | 350/96.23 |
| 4,166,670 | 9/1979 | Ramsay | 350/96.23 |
| 4,257,675 | 3/1981 | Nakagome et al. | 350/96.23 |
| 4,269,024 | 5/1981 | Ashpole et al. | 57/232 |
| 4,449,012 | 5/1984 | Voser | 174/70 A |
| 4,534,618 | 8/1985 | Brüggendieck | 350/96.23 |
| 4,575,184 | 3/1986 | Ueno et al. | 350/96.23 |
| 4,913,517 | 4/1990 | Arroyo et al. | 350/96.23 |
| 4,984,869 | 1/1991 | Roche | 350/96.23 |
| 5,133,034 | 7/1992 | Arroyo et al. | 385/107 |
| 5,224,192 | 6/1993 | Wagman | 385/112 |
| 5,345,525 | 9/1994 | Holman et al. | 385/104 |
| 5,388,175 | 2/1995 | Clarke | 385/100 |
| 5,649,041 | 7/1997 | Clyburn, III et al. | 385/109 |
| 5,651,081 | 7/1997 | Blew et al. | 385/101 |
| 5,657,410 | 8/1997 | Fehn et al. | 385/102 |
| 5,666,452 | 9/1997 | Deitz, Sr. et al. | 385/100 |
| 5,684,904 | 11/1997 | Bringuier et al. | 385/109 |
| 5,761,361 | 6/1998 | Pfandl et al. | 385/100 |

FOREIGN PATENT DOCUMENTS

| | | | |
|---|---|---|---|
| 0 410 736 A2 | 1/1991 | (EP) | H01B/11/00 |
| 0 553 990 B1 | 7/1997 | (EP) | G02B/6/44 |
| 8-15589 | 1/1996 | (JP) | G02B/6/44 |
| 8-75966 | 3/1996 | (JP) | G02B/6/44 |
| 9-5589 | 1/1997 | (JP) | G02B/6/44 |

OTHER PUBLICATIONS

JP–A–08015589, Jan. 19, 1996, Patent Abstracts of Japan.
JP–A–08075966, Mar. 22, 1996, Patent Abstracts of Japan.
JP–A–09005589, Jan. 10, 1997, Patent Abstracts of Japan.
Kaufman, Stanley, "The 1987 National Electrical Code Requirements of Cable", AT&T Bell Laboratories, International Wire & Cable Symposium Proceedings, 1986, pp. 545–553.
Sano, H. et al., "Development of Optical Fiber Units for Air Blown Fiber (ABF) Cabling Systems", Sumitomo Electric Industries, Ltd., International Wire & Cable Symposium Proceedings, 1989, pp. 69–75.

* cited by examiner

*Primary Examiner*—Robert H. Kim
*Assistant Examiner*—Michael P. Stafira
(74) *Attorney, Agent, or Firm*—Timothy J. Aberle

(57) ABSTRACT

A fiber optic cable comprising a plurality of tubes each having at least one optical fiber therein and at least one strength component. A center of the strength component being generally offset from a center-zone of the fiber optic cable. The fiber optic cable includes a center-zone interstice, the center-zone interstice spanning generally the center of the fiber optic cable between the tubes and the strength component. The center-zone interstice may include a water swellable substance for blocking the flow of water therein.

29 Claims, 2 Drawing Sheets

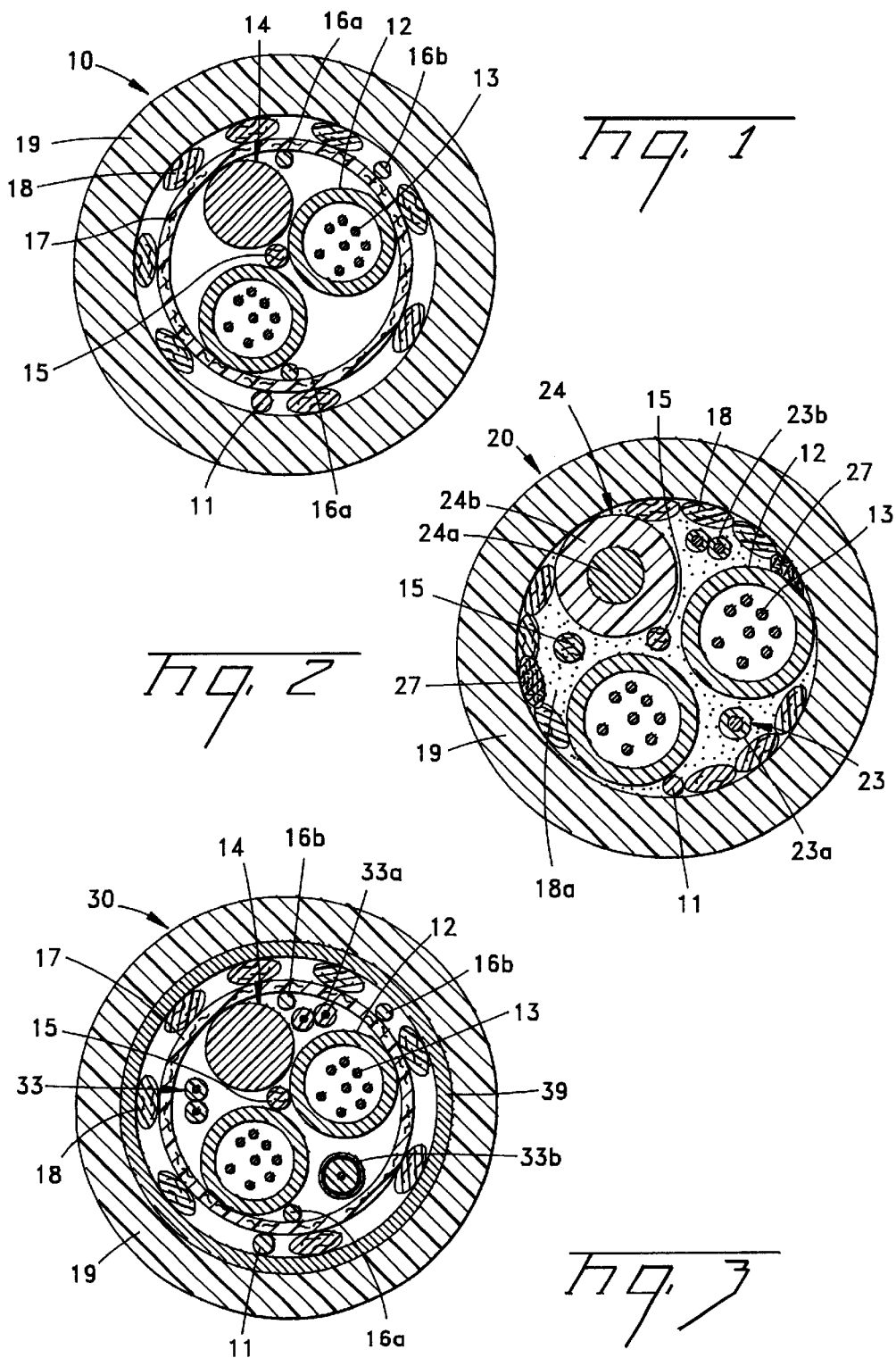

ROBUST FIBER OPTIC CABLES

The present invention relates to fiber optic cables and, more particularly, to fiber optic cables having at least one strength component.

Conventional fiber optic cables include optical fibers that conduct light and are used to transmit voice, video, and data information. A fiber optic cable may be subjected to bend, crush, tensile, and/or impact forces. For optimal end use functionality, it is therefore important for a fiber optic cable to exhibit suitable mechanical performance characteristics whereby undue changes in optical attenuation can be avoided. Additionally, although it is desirable for a fiber optic cable to have a suitable optical fiber count, it is also desirable for the cable to be as compact as possible.

For mechanical robustness, conventional fiber optic cables typically include strength members. However, the strength members may disadvantageously affect cable bending performance during installation, and may hinder optical fiber access. A fiber optic cable having strength members located in a single plane generally will experience a preferential bending action favoring bending of the cable out of the plane defined by the strength members. On the other hand, a fiber optic cable having strength members at spaced locations encircling the center of the cable will not have a preferential bend, but the strength members typically include a helical lay so that the cable can be bent. Even taking into account the helical lay of the strength members, when bent in generally any axis, cables of the non-preferential bend type may be very stiff, a characteristic which may be highly undesirable depending upon cable installation requirements. A cable designer may therefore balance the need to have sufficient strength members for mechanical robustness, against the size and stiffness contributions of the cable components that may render the cable difficult to install in a cable passageway. Moreover, the cost of the strength members can be an important factor.

Several representative conventional fiber optic cable designs are illustrative of the foregoing concerns. For example, U.S. Pat. No. 4,143,942 discloses a fiber optic cable having fiber optic elements carried along the length of elongate strength members. A tape is applied over the fiber optic elements and elongate strength member to establish a cable core, and a protective jacket is disposed over the cable core. The tape maintains the fiber optic elements and elongate strength member in assembled relation, provides a heat barrier, and facilitates stripping of the jacket without disturbing the cable core. A filler material may be interposed between the jacket and the taped cable core. The strength members and heat barrier tape, however, can raise concerns about the cost, size, weight, and stiffness of the fiber optic cable.

Conventional strength members may include a composite of aramid fibers and a resin. For example, U.S. Pat. No. 4,269,024 discloses a continuous elongate strength member for reinforcing an optical fiber cable consisting of a composite of aromatic polyamide filaments impregnated with a synthetic resin. The filaments are individually coated with the resin, and the filaments of at least an outer layer of the assembly are helically stranded. The impregnation is carried out by separating the filaments and immersing them in a low viscosity dispersion of the resin in a liquid medium. The filaments are then stranded, and the resin is cured. The aramid fiber/resin composite type strength members can disadvantageously contribute to the cost, size, weight, and stiffness of the fiber optic cable and raise an additional concern regarding ease of manufacturability.

Conventional strength members need not be formed into unitary components. For example, U.S. Pat. No. 5,345,525 discloses a fiber optic cable including a core having bundles of optical fibers and a yarn-like strength member system that is wrapped with an oscillated or unidirectional lay about the optical fibers. The strength member system provides impact resistance for the optical fibers. The yarn-like strength member system can disadvantageously contribute to the cost, size, weight, and stiffness of the fiber optic cable. Moreover, the optical fiber bundles are not protected by buffer tubes which can result in undue attenuation increases when the cable experiences operating conditions in the field.

OBJECTS OF THE INVENTION

It is an object of the present invention to provide a fiber optic cable having a plurality of tubes each having at least one optical fiber therein and at least one strength component. The strength component can be generally offset from a center-zone of the fiber optic cable. The cable may include a center-zone interstice, the center-zone interstice spanning generally the center of the fiber optic cable between the tubes and the at least one strength component. The cable may include a water swellable substance, the water swellable substance being generally located in the center-zone interstice for blocking the flow of water therein.

It is another object of the present invention to provide a fiber optic cable having a plurality of buffer tubes each having at least one optical fiber therein and at least one strength component, a center of the strength component being generally offset from a center of the fiber optic cable, the fiber optic cable having a compact size defining a center-to-center spacing between the center-zone of the cable and a center of each of the buffer tubes, the center-to-center spacing being about 2.0 mm or less for permitting a bend radius that minimizes undue attenuation in the optical fibers during cable bending, and providing a compact size for the cable that facilitates installation thereof in a cable passageway.

It is an object of the present invention to provide a fiber optic cable having tubes including at least one optical fiber therein and a strength component adjacent the tubes, the tubes and the strength component define a trilateral configuration, whereby upon bending of the fiber optic cable, the strength component is operative to resist bending forces and thereby prevent an undue change in attenuation in the optical fibers.

It is another object of the present invention to provide a fiber optic cable with tubes having at least one optical fiber therein and strength components adjacent the tubes. The tubes and the strength components define a quadrilateral configuration, whereby upon bending of the fiber optic cable, the strength components are operative to resist bending forces and thereby prevent an undue change in attenuation in the optical fibers.

BRIEF DESCRIPTION OF THE DRAWING FIGURES

FIG. 1 is a cross sectional view of a fiber optic cable according to the present invention.

FIG. 2 is a cross sectional view of a fiber optic cable according to the present invention.

FIG. 3 is a cross sectional view of a fiber optic cable according to the present invention.

DETAILED DESCRIPTION OF THE INVENTION

Figure 4:
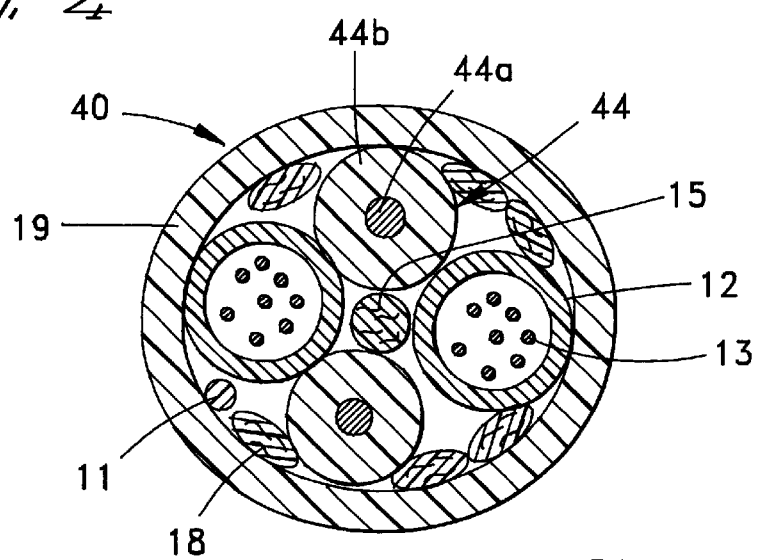
FIG. 4 is a cross sectional view of a fiber optic cable according to the present invention.

With reference to FIGS. 1–6, low-cost fiber optic cables 10,20,30,40,50,60 according to the present invention for use in, for example, indoor, outdoor, or indoor/outdoor applications, will be described.

Skilled artisans will appreciate that, in light of the present disclosure, fiber optic cables made according to the present invention can take various forms. For example, the present invention can be practiced in the form of a fiber optic cable 10 (FIG. 1) having one or more tubes 12 with optical fibers 13 disposed therein, for example, one or more conventional single mode and/or multi-mode optical fibers. Tubes 12 can be formed of a robust dielectric material, for example, polypropylene, and can include a dry water absorbent compound and/or a filling compound therein. Fiber optic cable 10 preferably includes at least one strength component 14, for example, a glass or fiber reinforced plastic rod, aramid or other strength imparting fibers, or one or more metal wires. Tubes 12 and strength component 14 can define an exemplary and generally trilateral configuration wherein the respective centers of tubes 12 and strength component 14 are generally offset from the center of fiber optic cable 10, and can be generally spaced apart at roughly about 120° degrees.

Depending upon the particular fiber optic cable application at hand, it can be important to provide water blocking protection in cables of the present invention. A center-zone interstice generally spanning the center of the cable, adjacent to or between tubes 12 and strength component 14, can include a water swellable substance for blocking the flow of water in the center-zone interstice. The water swellable substance can be, for example, superabsorbent fibers stranded with polyester fibers, or a superabsorbent polymer (SAP) impregnated in a yarn 15. Tubes 12 and strength component 14 can be wrapped by one or more binders 16a, 16b, and can be generally circumscribed by a water swellable tape 17. One or more ripcords 11 and/or strength filaments 18, e.g. fiberglass filaments, can be disposed adjacent water swellable tape 17. Rip cords 11 and/or filaments 18 can include a water swellable substance therein or thereon.

Cables of the present invention can include a durable cable jacket 19. Cable jacket 19 can be formed of polyethylene (PE) for outdoor applications. Alternatively, for indoor applications requiring satisfactory performance under UL-910 (plenum) or UL-1666 (riser) burn performance tests, cable jacket 19 can be formed of, for example, polyvinyl chloride (PVC). Alternatively, cable jacket 19 can be formed of polyvinylidene fluoride (PVDF) for indoor or indoor/outdoor applications.

The present invention can also be practiced in the form of a fiber optic cable 20 (FIG. 2) including one or more water swellable binders 27 in lieu of or in addition to water swellable tape 17. Additionally, fiber optic cable 20 can include one or more optical transmission elements 23 outside of tubes 12, for example, a tight buffered optical fiber 23a or a single fiber cable 23b. Fiber optic cable 20 can also include an offset strength component 24 having a center member 24a formed of, for example, a glass or a fiber reinforced material, or a metallic material that is upjacketed with, e.g., a layer of plastic 24b. Upjacket layer 24b can be formed of, for example, a medium density PE material.

A fiber optic cable according to the present invention can also take the form of a composite cable 30 (FIG. 3) that includes a combination of both optical and electrical components 33. The electrical components can be, for example, one or more medium to very small sized electrical coaxial cables 33b and/or twisted pair conductors 33a. Additionally, fiber optic cables according to the present invention can include an armor layer 39 formed of a metallic and/or a high-strength non-metallic material. Armor layer 39 can include a layer of a water swellable material (not shown) disposed on or adjacent thereto as disclosed in U.S. Pat. Nos. 5,039,197 and 5,188,883, the respective disclosures of which are incorporated by reference herein.

Fiber optic cables 10,20,30 can be manufactured with a generally round profile, for example, having an OD of about 12 mm or less, but preferably about 10.5 mm or less. To achieve a generally round profile, a cross sectional area ratio, defined as the ratio of the cross sectional areas of strength components 14,24 relative to the cross sectional area of respective tubes 12, can be selected so that the cross sectional area ratio is within a range of about 1.0 to about 0.55. More preferably, the cross sectional area ratio is about 1.0 to about 0.7. According to the present invention, the cross sectional area ratio can be determined consideration of desired cable performance characteristics, for example, crush strength, strain, flexure, weight, size, burn test performance, and/or cost. In addition, other cable components can affect the roundness of fiber optic cables of the present invention. For example, the inclusion of a water swellable tape 17, optical and/or electrical components 23,33, large water swellable yarns 15, and/or an armor layer 39, can enhance the roundness of the cables. Additionally, the lay length of tubes 12 and strength components 14,24 can be adjusted to make the cable more or less round.

Figure 5:
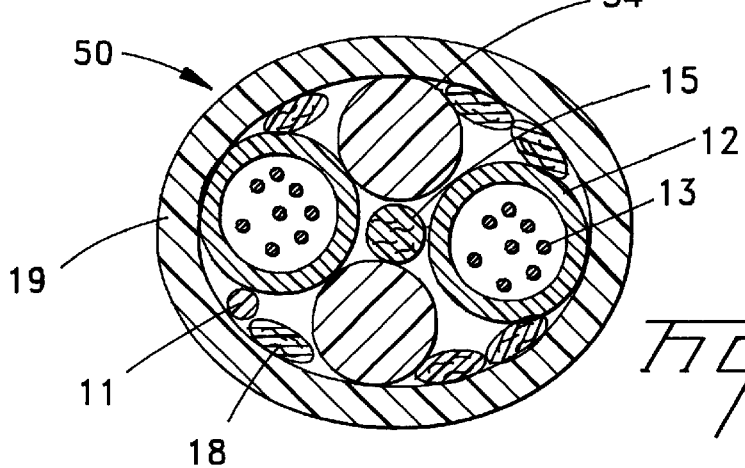
FIG. 5 is a cross sectional view of a fiber optic cable according to the present invention.
Figure 6:
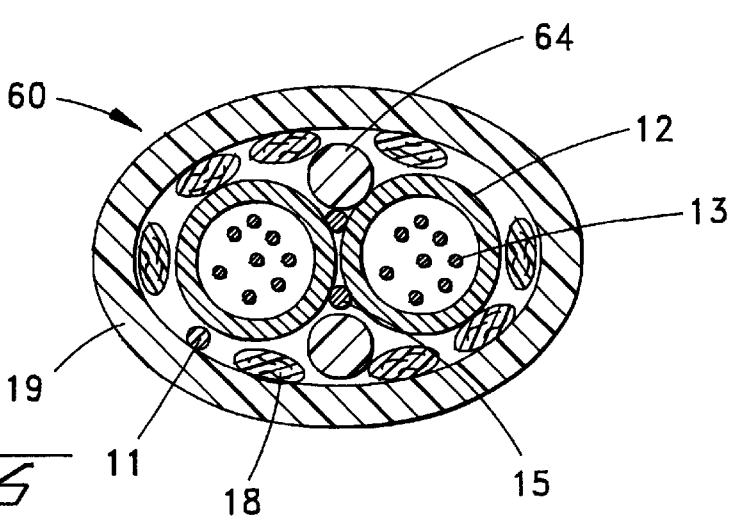
FIG. 6 is a cross sectional view of a fiber optic cable according to the present invention.

Alternatively, fiber optic cables according to the present invention can include a generally non-round profile, for example, as embodied by cables 40,50,60 (FIGS. 4–6). Fiber optic cables 40,50,60 can define an exemplary and generally quadrilateral configuration of tubes 12 and strength components. For example, fiber optic cable 40 can include two offset strength components 44 having a single metal strength member 44a, or stranded wires (not shown), having a plastic upjacket 44b. Upjacket 44b can include an outside diameter (OD) that renders the cross sectional area ratio of strength component 44 with respect to the cross sectional area of a tube 12 to be about 1.0 to about 0.3. For example, in fiber optic cable 50 (FIG. 5) the cross sectional area ratio of strength components 54 with respect to the cross sectional area of a tube 12 is about 1.0 to about 0.5. As a further illustration, fiber optic cable 60 (FIG. 6) includes strength components 64 defining a cross sectional area ratio relative to a tube 12 of about 0.5 to 0.25. The cross sectional area ratio can be selected to achieve the desired ovalness of the cable so that, in general, the lower the cross sectional area ratio value is, the more oval the cable profile can be.

Manufacture of fiber optic cables 10,20,30,40,50,60 can be accomplished with relative ease and a low manufacturing cost. Preferably, tubes 12 and strength components 14,24, 44,54,64 are stranded with an oscillated lay about generally the center of the respective cable. The lay length is preferably about 50 mm to about 200 mm or more. As noted above, the center-zone interstice between tubes 12 and strength components 14,24,44,54,64 can include, for example, a water swellable yarn 15. Tubes 12 and strength components 14,24,44,54,64 can be held together by one or more core wrap binders 16a, 16b and/or 27. Strength filaments 18 can be longitudinally placed or helically wrapped about the cable core prior to pressure extrusion of cable jacket 19. Alternatively, rather than pressure extrusion, jacket 19 can be tubed on for enhanced flexure and easy stripping of jacket 19 in the field.

Cables 10,20,30,40,50,60, can be manufactured to a compact size. For example, fiber optic cables according to the present invention can have a center-to-center spacing defined generally between the center of the cable and a center of a buffer tube of about 3.0 mm or less, preferably about 2.0 mm or less. The center-to-center spacing allows a large bend radius and long lay length for the fibers for minimizing undue attenuation changes during cable bending. The compact size of cables 10,20,30,40,50,60 facilitates easy installation in cable passageways, and the use of tubes 12 permits mid-span access of optical fibers 13.

Fiber optic cables 10,20,30,40,50,60 can meet or exceed industry-standard mechanical requirements for avoiding undue attenuation changes. For example, fiber optic cables of the present invention can pass low and high temperature cable bend, impact resistance, compressive strength, tensile strength, cable twist, cyclic flexing, and temperature cycling tests. Additionally, where appropriate for indoor or indoor/outdoor applications, fiber optic cables of the present invention can pass flammability tests, e.g., UL-910 and/or UL-1666. For example, the cross sectional area ratios and/or offset positions of tubes 12 and strength components 14,24, 44,54,64 impart robustness to the cables for meeting the foregoing mechanical requirements. To illustrate, the trilateral configuration of tubes 12 and strength components 14,24 of cables 10,20,30 (FIGS. 1–3) resists bending, impact, and crush forces for minimizing attenuation changes in optical fibers 13. In a like manner, the quadrilateral configuration of tubes 12 and strength components 44,54,64 of cables 40,50,60 (FIGS. 4–6) resists bending, impact, and crush forces for minimizing attenuation changes in optical fibers 13. Moreover, use of the strength components in the trilateral and quadrilateral configurations of the present invention avoids unnecessary use of strength components and minimizes cost, stiffness, and size of the cables.

The present invention has thus been described with reference to the foregoing embodiments, which embodiments are intended to be illustrative of the present inventive concepts rather than limiting. Persons of ordinary skill in the art will appreciate that variations and modifications of the foregoing embodiments can be made without departing from the scope of the appended claims. For example, strength components 14,24,44,54,64 are illustrated in the appended drawings as being generally round in cross section, but they can take other shapes, and may include one or more hollow sections and/or irregular surface contours, depending on, e.g., the desired strength characteristics and costs. One or more strength members can be embedded in the cable jacket. Fibers 13 can be part of one or more optical fiber ribbons or bundles. The water swellable substance in the center-zone can be in a form other than a yarn 15, for example, the water swellable substance may comprise a water swellable tape or a SAP powder. Alternatively, portions of the tubes or strength members can include a SAP disposed thereon or therein, as disclosed in U.S. Pat. Nos. 5,684,904 and 5,649, 041, the respective disclosures of which are incorporated by reference herein. In addition, water is swellable yarn 15 can perform a water blocking function in the cable, or it can include strength filaments whereby it can provide some degree of tensile strength as well. Moreover, yarn 15 may migrate in some portions of the cable to occupy a position other than in the center-zone of the cable, as shown in FIG. 1.

Tubes 12 can be surrounded by strength filaments 18a (FIG. 2), e.g., aramid fibers or yarns. Additionally, tubes 12 can be in contact with each other and with strength components 14,24,44,54,64 or some gaps can exist therebetween. Further, skilled artisans can appreciate that, after having the benefit of the present disclosure, fiber optic cables of the present invention can take forms other than the exemplary and generally trilateral and quadrilateral configurations noted above, for example, with more or less strength members or tubes. The invention can be practiced with a single buffer tube stranded with a single strength component. As described above, strength components 14,24,44,54,64 can be generally offset from the center of the cable but may, along some portions of the cable, be more or less closer to the center of the cable.

Accordingly, what is claimed is:

1. A fiber optic cable, comprising:
a plurality of tubes each having at least one optical fiber therein;
at least one strength component, a center of said strength component being generally offset from a center-zone of said fiber optic cable;
a center-zone interstice, said center-zone interstice spanning generally the center of said fiber optic cable between said tubes and said at least one strength component; and
a water swellable substance, said water swellable substance being located in said center-zone interstice for blocking the flow of water therein.

2. The fiber optic cable of claim 1, said tubes and said strength component defining a generally trilateral configuration.

3. The fiber optic cable of claim 1, said fiber optic cable including a second strength component.

4. The fiber optic cable of claim 3, said tubes and said strength components defining a generally quadrilateral configuration.

5. The fiber optic cable of claim 1, said strength component and one of said tubes having respective cross sectional areas, a cross sectional area ratio thereof being within a range of about 1.0 to about 0.7.

6. The fiber optic cable of claim 1, a cross sectional area ratio defined by a cross sectional area of said strength component and a cross sectional area of one of said tubes being about 1.0 to about 0.3.

7. The fiber optic cable of claim 1, said strength component including a metallic portion.

8. The fiber optic cable of claim 1, said fiber optic cable including at least one electrical component.

9. The fiber optic cable of claim 1, said fiber optic cable including an optical transmission element not within said tubes.

10. The fiber optic cable of claim 1, said fiber optic cable including an armor layer.

11. The fiber optic cable of claim 1, said fiber optic cable including a water swellable tape.

12. The fiber optic cable of claim 1, said fiber optic cable including a water swellable binder.

13. The fiber optic cable of claim 1, said fiber optic cable including strength members.

14. The fiber optic cable of claim 1, said fiber optic cable including a generally round profile.

15. The fiber optic cable of claim 1, said fiber optic cable including a generally non-round profile.

16. The fiber optic cable of claim 1, said strength component comprising a rod-like member.

17. The fiber optic cable of claim 1, wherein said fiber optic cable includes a cable jacket formed of a PE, PVC, or PVDF material.

18. A fiber optic cable, comprising:

a plurality of buffer tubes each having at least one optical fiber respectively therein;

at least one strength component, a center of said strength component being generally offset from a center of said fiber optic cable;

said fiber optic cable having a compact size defining a center-to-center spacing between the center-zone of the cable and a center of each of the buffer tubes, said center-to-center spacing being about 2.0 mm or less for permitting a bend radius that minimizes undue attenuation in said optical fibers during cable bending, and providing a compact size for said cable that facilitates installation thereof in a cable passageway.

19. A fiber optic cable, comprising:

a plurality of tubes each having at least one optical fiber therein;

a strength component adjacent said tubes; said tubes and said strength component defining a trilateral configuration, and an interstice therein generally aligned with a center of said fiber optic cable said interstice including a water swellable substance.

20. The fiber optic cable of claim 19, a cross sectional area ratio being defined as a ratio of a cross sectional area of said strength component with respect to a cross sectional area one of said tubes, said ratio being about 1.0 or less.

21. The fiber optic cable of claim 19, said fiber optic cable having an OD of about 12 mm or less.

22. A fiber optic cable, comprising:

a plurality of tubes each having at least one optical fiber therein;

strength components adjacent said tubes;

said tubes and said strength components defining a quadrilateral configuration.

23. The fiber optic cable of claim 22, a cross sectional area ratio being defined as the ratio of the cross sectional area of one of said strength components with respect to the cross sectional area of one of said tubes, said ratio being about 1.0 or less.

24. The fiber optic cable of claim 22, having an interstice therein generally aligned with a center of said fiber optic cable said interstice including at least one water swellable substance.

25. A fiber optic cable, comprising:

a tube having at least one optical fiber therein;

at least one strength component, a center of said strength component being generally offset from a center-zone of said fiber optic cable;

said tube and said strength component being stranded about said center-zone;

a center-zone interstice, said center-zone interstice spanning generally the center of said fiber optic cable between said tubes and said at least one strength component; and a water swellable substance, said water swellable substance being located in said center-zone interstice for blocking the flow of water therein.

26. A fiber optic cable, comprising:

a plurality of tubes each having at least one optical fiber therein;

at least one strength component, a center of said strength component being generally offset from a center-zone of said fiber optic cable;

a layer of water-swellable strength filaments generally surrounding or adjacent to said tubes and said strength component;

a center-zone interstice, said center-zone interstice spanning generally the center of said fiber optic cable between said tubes and said at least one strength component; and a water swellable substance, said water swellable substance being located in said center-zone interstice for blocking the flow of water therein.

27. The fiber optic cable of claim 26, said cable being constructed of all dielectric materials.

28. The fiber optic cable of claim 26, said cable having no petroleum derivative lubricants therein.

29. The fiber optic cable of claim 26, said cable comprising a cross sectional area ratio being defined as the ratio of the cross sectional area of the strength component with respect to at least one of said buffer tubes, said cross sectional area ratio being about 1.0 to about 0.55.

* * * * *